Patented Sept. 15, 1942

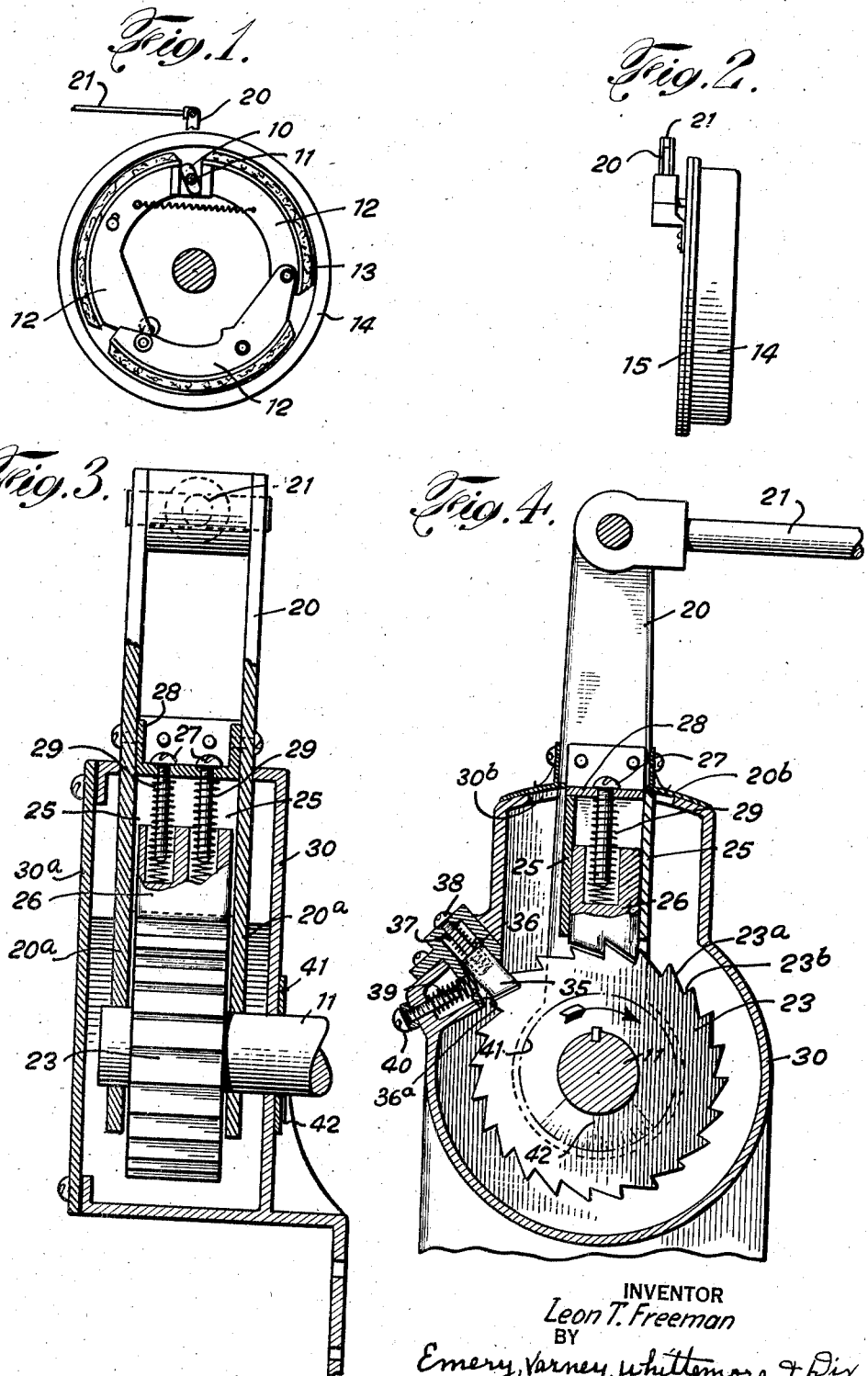

2,296,026

UNITED STATES PATENT OFFICE 2,296,026

BRAKE MECHANISM

Leon T. Freeman, Scranton, Pa., assignor to Chester H. Shively, Fremont, Ohio

Application October 9, 1941, Serial No. 414,229

4 Claims. (Cl. 188—79.5)

This invention relates to brake operating mechanism and has for an object the provision of improvements in this art.

The invention provides simple and effective mechanism for automatically adjusting the action of the cam shaft which operates the spreader cam for brake shoes whereby the brake lining is always kept in proper position relative to the brake drum for applying the brakes when actuated. In the past, many accidents have been caused by reason of brake linings becoming worn below effective thickness after they have been adjusted. Most brakes must be adjusted manually to compensate for wear; and while some automatic adjusters have been proposed they have been rather complicated and none too reliable or easy to maintain. Many of them contemplate a completely revised cam shaft and brake cover plate construction or, in some cases, an entirely new brake assembly. The present invention utilizes stock equipment to a large extent and is readily applied as an attachment.

The invention eliminates brake failures which frequently occur when brake linings are worn to a point where they should be adjusted. It assures full efficiency of the brakes until the linings or even the brake drums are worn to the full effective throw of the spreader cams in an entirely automatic manner and without manual adjustment. It also assures adequate braking power throughout the full life of the brake linings by maintaining the action near a maximum at all times, thus minimizing overheating and scoring of brake drums due to slippage.

The objects, advantages and certain features of novelty of the invention will be apparent from the following description and accompanying illustration of a representative embodiment of the invention, reference being made to the accompanying drawing wherein:

Fig. 1 is an assembly view in elevation of the brake mechanism of a wheel;

Fig. 2 is a side elevation of the parts shown in Fig. 1;

Fig. 3 is a vertical axial section of the brake adjusting mechanism; and

Fig. 4 is a transverse section taken on Fig. 3.

Referring to the drawing, the usual brake expanding cam 10 and its shaft 11 spread the brake shoes or bands 12 against spring action to press the brake lining 13 against the brake drum 14. The brake shaft 11 is turnably mounted in a bearing in a fixed cover plate 15 which is secured to the wheel shaft housing. The brakes are operated by a brake arm 20 and a brake actuating rod 21 by hand or power, as desired. The rod is pulled to the left, as shown in Fig. 1, to apply the brakes, and moves to the right to release the brakes. A stop of appropriate nature is provided for limiting the release or off position of the brake actuating rod and arm, but over-movement may be obtained in the brake applying direction to assure full brake application at all times. The stop and movement permitting means are not illustrated because they are usual and generally inbuilt into the brake operating mechanism.

To the cam shaft 11 there is secured a ratchet gear 23 provided with ratchet gear teeth having long sloping faces 23a and approximately radial edges or risers 23b. On the shaft 11 at the sides of the gear 23 there are loosely mounted the spaced or bifurcated ends 20a of the cam shaft arm 20. Between the spaced sides 20a there are secured, as by welding, riveting, screws or the like, spaced guides 25 for a radially moving pawl 26.

The pawl 26 is held toward the teeth of the ratchet gear by one or more springs 29 which are retained in proper position by a corresponding number of guide screws 27. A cover plate 28, which is removably secured to the arm ends 20a by screws or other suitable means, takes the reaction pressure of the springs 29 and keeps the screws 27 in position. The provision of the removable plate 28 permits ready access to the pawl for replacement when worn.

The ratchet gear 23 and the inner end of the arm 20 are fully enclosed by a housing or casing 30 which is secured in fixed position on any suitable support, as for example upon the cover plate 15. A sealed cover plate 30a may be provided to permit the assembly of parts. A slot 30b is formed in the top of the housing to permit the necessary movement of arm 20. The arm may carry a removable arcuate plate 20b to keep the slot 30b covered.

Adjacent the pawl 26 and cooperating with the teeth of the same ratchet gear 23, there is an adjustment pawl 35. This operates in a radial enclosed recess 36 in the housing. Springs 37 hold the pawl 35 downward against the teeth of the ratchet gear, and screws 38 hold the springs in proper position. The cover of the recess may be removable to permit replacement of the pawl 35. The pawl 35 is pressed circumferentially toward the risers of the ratchet teeth and the side of the recess by one or more springs 39 guided by screws 40, and is limited in reverse circumferential movement by the inclined rear face of the recess. This circumferential movement of the pawl 35 requires the ratchet gear to move more than a tooth face length by a predetermined amount before the brakes are adjusted and provides that the brakes will be released after adjustment.

In order that the adjusted positions of the brake cam may be readily checked from the exterior, suitable gauge means may be employed, as for example, a fixed scale plate 41 and a cooperating pointer 42 on the cam shaft 11. The pointer preferably is aligned with the longer dimension of the cam so as to indicate directly the position of the cam.

In operation, the pawl 26 and its carrying arm 20 move the ratchet gear 23 and the cam shaft 11 around to apply the brakes, and all of the parts move back to a fixed position when the brakes are released. In Fig. 4 the parts are shown in an intermediate position where the arm 20 has been moved forward a short distance and the adjustment pawl 35 has come against the front face of its recess. The parts are so proportioned that this movement is less than the face length of a single gear tooth. The adjustment pawl will ride on the face of a tooth but normally will not fall off the edge upon the next tooth. But as the brake bands become worn and the ratchet gear moves further and further in the brake-applying direction, the adjustment pawl will move over to the front face of its guide recess as usual and will then drop off to the next tooth and hold the ratchet gear against reverse movement except that required to release the brakes. It will be noted that the adjustment pawl is pushed forward by the springs 39 to a drop-off position but can thereafter move back to the inclined rear face of its recess to release the brakes. When the pawl 26 returns it will move back one tooth so that it will engage a new tooth on the next forward movement. At first, after adjustment, the ratchet gear will move forward only about the amount of the loose movement of the adjustment pawl, but eventually it will move this distance plus the length of a tooth face and cause a new adjustment, as before.

While one embodiment of the invention has been described for purposes of illustration, it is to be understood that the invention may have various embodiments within the limits of the prior art and the scope of the subjoined claims.

I claim:

1. Brake operating mechanism, comprising in combination, a cam operating shaft, a ratchet gear secured on said shaft, an operating arm mounted on said shaft at said ratchet gear, said arm being bifurcated to straddle the ratchet gear, a fixed housing enclosing said ratchet gear and the inner end of said arm and provided with an operating opening for said arm for actuation from the outside of the housing, guides secured between the sides of said arm beyond the ratchet gear, a slidable pawl mounted between the guides, a removable plate above the ends of said guides, resilient means between the plate and pawl pressing the pawl toward said ratchet gear, an adjustment pawl slidably mounted in a radial recess in said housing, resilient means urging the adjustment pawl toward the gear, means for permitting and limiting rearward circumferential movement of said adjustment pawl, and resilient means urging the adjustment pawl in a forward circumferential direction against a stop means in its guide recess.

2. Brake operating mechanism, comprising in combination, a cam operating shaft, a ratchet gear secured on said shaft, an operating arm mounted on said shaft at said ratchet gear, said arm being bifurcated to straddle the ratchet gear, a fixed housing enclosing said ratchet gear and the inner end of said arm and provided with an operating opening for said arm for actuation from the outside of the housing, guides secured between the sides of said arm beyond the ratchet gear, a slidable pawl mounted between the guides, a removable plate above the ends of said guides, resilient means between the plate and pawl pressing the pawl toward said ratchet gear, an adjustment pawl slidably mounted in a radial recess in said housing, resilient means urging the adjustment pawl toward the gear, means for permitting and limiting rearward circumferential movement of said adjustment pawl, and resilient means urging the adjustment pawl in a forward circumferential direction against the front edge of its guide recess, the faces of the ratchet teeth being longer than the length of circumferential movement of the operating pawl when the brakes are initially adjusted and until they are considerably worn, whereby when the brakes are worn to require a sufficiently long stroke of the operating pawl the ratchet gear is moved sufficiently to permit the adjustment pawl to drop to another tooth and hold the ratchet gear so that upon its next return movement the operating pawl will drop back to another tooth for further action until the brakes become worn again.

3. Brake operating mechanism, comprising in combination, a housing, a shaft mounted in said housing for expanding brake elements into braking position against a constantly acting return element, a ratchet gear secured on said shaft within said housing, an operating arm mounted on said shaft at the ratchet gear and having actuating connections outside said housing, a radially movable operating pawl slidably mounted in guides on said arm for actuating said ratchet gear, a spring mounted on a radial guide pin for pressing said operating pawl against said ratchet gear, a removable plate carrying said guide pin and permitting removal of said operating pawl, an adjustment pawl mounted in a radial recess in said housing for holding the ratchet gear, said recess being flared interiorly to permit the adjustment pawl to have limited circumferential movement, a spring mounted on a radial guide pin for pressing said adjustment pawl against said ratchet gear, a removable plate carrying said guide pin and permitting removal of said adjustment pawl, and a spring urging said adjustment pawl in a forward circumferential direction against a radial face of a ratchet gear tooth and toward the front face of the pawl recess.

4. Brake operating mechanism comprising in combination, a housing, a cam operating shaft mounted in said housing, a ratchet gear secured on said shaft within said housing, an operating arm carrying a pawl for operating said gear, an adjustment pawl mounted in a radial recess in said housing, the recess being flared on its rear side at the inner end to permit the pawl to have limited circumferential movement, a spring mounted on a radial guide pin for pressing said adjustment pawl against said ratchet gear, and a spring mounted on a guide pin for pressing the inner end of the adjustment pawl against the radial face of a ratchet gear tooth and toward the front face of the pawl recess.

LEON T. FREEMAN.